United States Patent [19]
Lang et al.

[11] 3,908,782
[45] Sept. 30, 1975

[54] AUTOMATIC STABILITY CONTROL SYSTEM

[75] Inventors: Thomas J. Lang, Torrance, Calif.; Joseph A. Lang, Huntington Station; Kenneth G. Lang, East Northport; Robert L. Davis, Huntington, all of N.Y.

[73] Assignee: Lang Davis Industries, Inc., Huntington, N.Y.

[22] Filed: Sept. 20, 1973

[21] Appl. No.: 399,196

Related U.S. Application Data

[63] Continuation-in-part of Ser. No. 269,035, July 5, 1972.

[52] U.S. Cl. .................... 180/103; 188/3 R; 303/7; 303/20
[51] Int. Cl.² ............................................ B60T 7/20
[58] Field of Search ............ 180/103, 104; 188/3 R, 188/112, 181 A; 280/446 B; 303/7, 20, 21 CE, 24 A

[56] References Cited
UNITED STATES PATENTS

| | | | |
|---|---|---|---|
| 3,288,240 | 11/1966 | Franzel | 180/103 UX |
| 3,398,991 | 8/1968 | Compton | 180/104 X |
| 3,574,414 | 4/1971 | Jacob | 188/3 R X |
| 3,715,003 | 2/1973 | Jubenville | 180/103 |
| 3,758,165 | 9/1973 | Savelli | 180/103 X |
| 3,780,832 | 12/1973 | Marshall | 188/3 R |

FOREIGN PATENTS OR APPLICATIONS

| | | | |
|---|---|---|---|
| 2,024,406 | 12/1970 | Germany | 188/112 |

*Primary Examiner*—Trygve M. Blix
*Assistant Examiner*—Stephen G. Kunin
*Attorney, Agent, or Firm*—Clarence A. O'Brien; Harvey B. Jacobson

[57] ABSTRACT

An automatic stability control system is provided which senses the lateral acceleration of a vehicle by way of a pendulum-type transducer, or the like, to provide lateral acceleration signals to an amplifier. The amplified signals control a brake assembly on the vehicle to simultaneously, continuously and gradually apply the right and left brakes with a force proportional to the lateral acceleration signals in order to eliminate swerving or swaying of the vehicle. The amplifier is mounted in the vehicle and includes a sensitivity adjustment for setting a threshold point corresponding to a minimum lateral acceleration force to which the system will respond. The control system is primarily adapted for use in a trailing or towed vehicle in combination with a leading or towing vehicle although it is equally effective when used in a single vehicle.

21 Claims, 21 Drawing Figures

AUTOMATIC STABILITY CONTROL SYSTEM

CROSS-REFERENCE TO RELATED APPLICATION

This application is a continuation-in-part of our co-pending application Ser. No. 269,035, filed July 5, 1972 for Lateral Acceleration Sensing System.

BACKGROUND OF THE INVENTION

The present invention is generally related to trailer brake systems and, more particularly, to an automatic stability control system for trailers and other towed vehicles to eliminate swaying and swerving behind a towing vehicle.

In the past, various trailer brake systems have been proposed to prevent undesirable movements of a trailer behind its towing vehicle. Many conventional systems have included manually operated controls for effecting braking of the trailer, while others have been provided with semi-automatic controls connected to the towing vehicle's brake system to simultaneously apply the brakes of both the towing vehicles and trailer. It is apparent that such conventional systems either require the personal attention of the vehicle driver or do not provide independent braking of the towing vehicle and trailer.

More recently, automatic trailer braking systems have been proposed in attempts to automatically stabilize the trailer and prevent adverse swaying behind the towing vehicle. One such system is disclosed by U.S. Pat. No. 3,288,240 to Franzel, issued Nov. 29, 1966. The Franzel system utilizes a sensor or group of sensors including acceleration responsive switches, such as mercury switches, which are closed in response to predetermined lateral acceleration conditions acting upon the trailer. Closure of one of the switches causes energization of one of the electrical brakes associated with the trailer. With the Franzel system, the magnitude of the braking forces is limited to a number of values, with gaps between the values. Thus, under most conditions, the brake forces applied by the Franzel system are not truely proportional to the lateral acceleration forces which are sensed, resulting in overbraking or underbraking, possibly causing loss of control over the trailer resulting in considerable wear or damage to the trailer and/or towing vehicle. Also, the Franzel system provides separate control over the left and right brakes with only one of the two being operated at any one time to correct the lateral acceleration condition. Depending upon the dynamics of the trailer, which vary with the trailer load, it is possible that the response of the Franzel system in applying the right or left brake may be out of phase with the swerving or swaying condition, such that the condition is amplified, rather than attenuated, leading to uncontrollable fishtailing or possibly jackknifing.

The control circuit associated with the Franzel system is such that a substantial portion of brake current flows through the sensor switches, requiring the use of large, heavy duty switches which are costly to manufacture and occupy a considerable amount of space. Also, the sensitivity of the Franzel system is not readily adjustable in nature, it being necessary to adjust the switches etc. while the vehicle is at a standstill in an attempt to obtain a satisfactory threshold setting corresponding to a minimum lateral acceleration force to which the system should respond.

It is an object of the present invention to provide a novel automatic stability control system for trailers and the like which overcomes the above-mentioned shortcomings of conventional systems.

Another object of the present invention is to provide a unique automatic stability control system including means for simultaneously applying brakes on both sides of a towed vehicle in response to predetermined lateral acceleration conditions, whereby swerving or swaying of the towed vehicle behind its towing vehicle is automatically prevented or significantly attenuated, regardless of the trailer load or system response time.

It is a further object of the present invention to provide a versatile stability control system including means for amplifying low amperage lateral acceleration signals furnished by compact transducers, whereby the amplifier provides relatively high braking currents to the associated trailer braking system.

Still another object of the present invention is to provide an automatic stability control system including a signal amplifier adapted to be mounted in the towing vehicle and provided with an adjustment for conveniently setting the sensitivity of the system even while the vehicle is in motion, thereby making it possible to obtain the best setting for the particular road conditions and trailer load.

It is still a further object of the present invention to provide a novel lateral acceleration force transducer including a pair of mass elements each operatively connected to a variable resistor or other circuit element, the mass elements being movable in opposite directions in response to corresponding lateral forces such that only one of the mass elements is moved at a time.

Yet another object of the present invention is to provide an automatic stability control system including lateral acceleration transducers in combination with a manually adjustable control and/or brake pedal responsive control which together provide braking of the trailer under a wide variety of conditions.

SUMMARY OF THE INVENTION

In carrying out the above objects of the present invention, the stability control system is provided with an amplifier, preferably mounted in the towing vehicle, with an adjustment for setting the sensitivity of the system. A pair of transducers are provided with adjustable resistors, for example, associated with the amplifier input. The effective value of this pair of resistors in the amplifier circuit is varied in proportion to the magnitude of the sensed lateral acceleration forces to provide control signals to the trailer brakes. Preferably, the amplifier is provided with power transistors with the variable resistors controlling the base bias to the input transistor. This arrangement provides accurately controlled braking, as the applied brake forces are gradual and continuously applied after actuation and are proportional to the sensed lateral acceleration forces. Preferably, the sensitivity adjustment is provided in the form of a selectively adjustable resistor, such as a potentiometer, also associated with the base bias of the first amplifying transistor, to determine the threshold point at which the transistor conducts. Under some conditions, the system may be set to be insensitive to mild lateral acceleration forces, and under other conditions to respond to such mild forces.

In a second form of the invention, a manually adjustable control and brake pedal responsive control are also associated with the amplifier input to further control the base bias to the input transistor. With this arrangement, the system is capable of responding to the lateral acceleration forces, as well as to operation of the manual control and/or application of the towing vehicle brakes. Application of the towing vehicle brakes automatically actuates the trailer brakes, regardless of the absence of lateral acceleration forces acting upon the trailer and vice versa.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
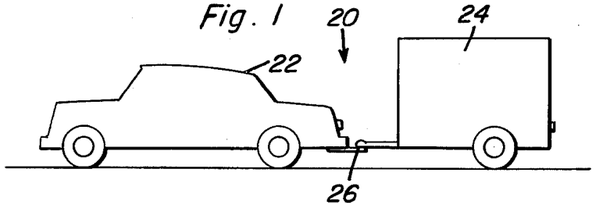
FIG. 1 is an elevational view of a typical towing vehicle and trailer assembly utilizing the stability control system of the present invention.
Figure 2:
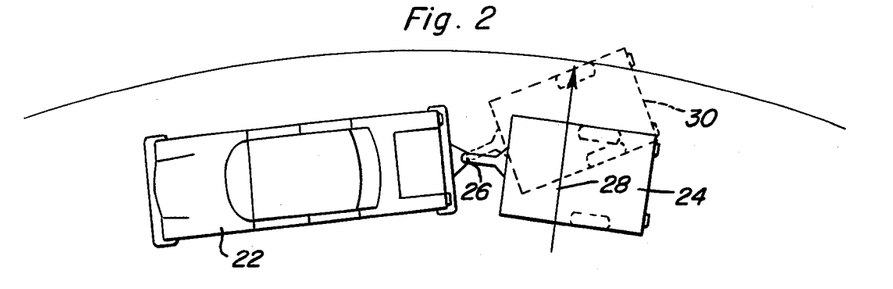
FIG. 2 is a top plan view of the towing vehicle and trailer rounding a curve.
Figure 3:
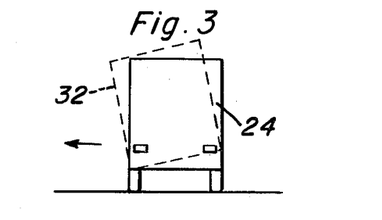
FIG. 3 is a front end view of the trailer shown in FIG. 2 with a dash line view of the trailer in a tilted position due to lateral acceleration forces.

Referring now, more particularly, to FIGS. 1–3, a typical towing vehicle and trailer combination utilizing the system of the present invention is generally indicated by the numeral 20 and includes an automobile, or other towing vehicle, 22 operatively connected to a trailer 24, by way of a trailer hitch 26. The trailer hitch is of a conventional type which permits pivotal movement of the trailer relative to the towing vehicle. While such a pivotal connection is necessary between the towing vehicle and the trailer to permit cornering and other maneuvers, the trailer is susceptible to swerving or fish-tailing relative to the towing vehicle under adverse conditions. Most often, these conditions occur when the towing vehicle is proceeding around a curve, as illustrated in FIG. 2. When negotiating a curve, both the towing vehicle and trailer experience lateral acceleration forces acting in a radially outward direction as indicated by arrow 28 in FIG. 2. When the lateral acceleration forces acting upon the trailer exceed the frictional forces of the tires engaged with the road, the trailer tends to break away and swing outwardly to a position such as that indicated in dash line at 30 in FIG. 2. This movement can cause the trailer to jackknife or fishtail behind the vehicle, causing loss of control over the trailer. This skidding or breakaway condition of the trailer is normally accompanied by tilting of the trailer as the trailer rounds the curve, such as that indicated in dash line at 32 in FIG. 3.

The stability control system of the present invention senses the lateral acceleration forces acting upon the trailer to apply the trailer brakes to reduce its speed sufficiently to prevent a skid condition. It will be appreciated that the lateral acceleration forces which are sensed by the control system of the present invention may take several forms other than forces imparted to the trailer when negotiating a curve. For example, a sudden gust of wind or change in road surface contour which impart lateral forces to the trailer will also be sensed by the system to provide necessary braking of the trailer to prevent loss of control.

Figure 4:
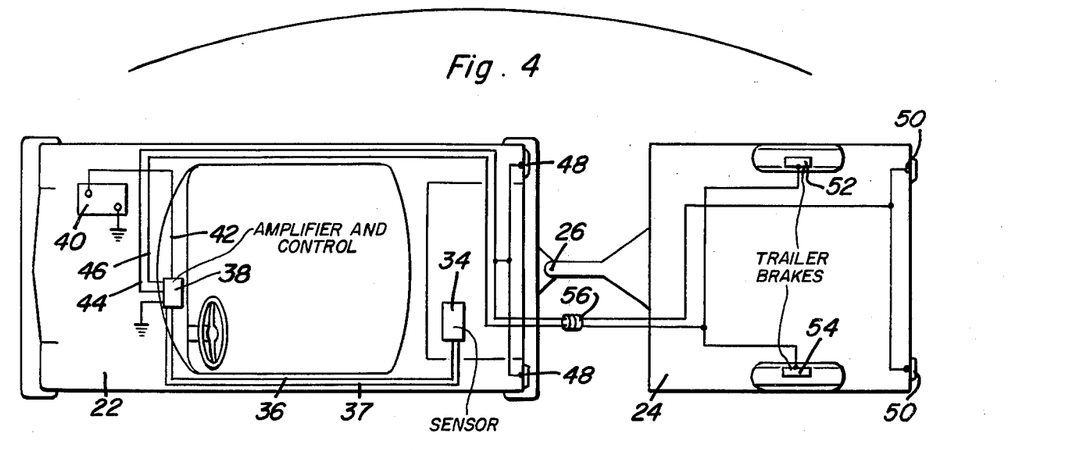
FIG. 4 is a diagrammatic illustration of a first form of the automatic stability control system of the present invention.
Figure 6:
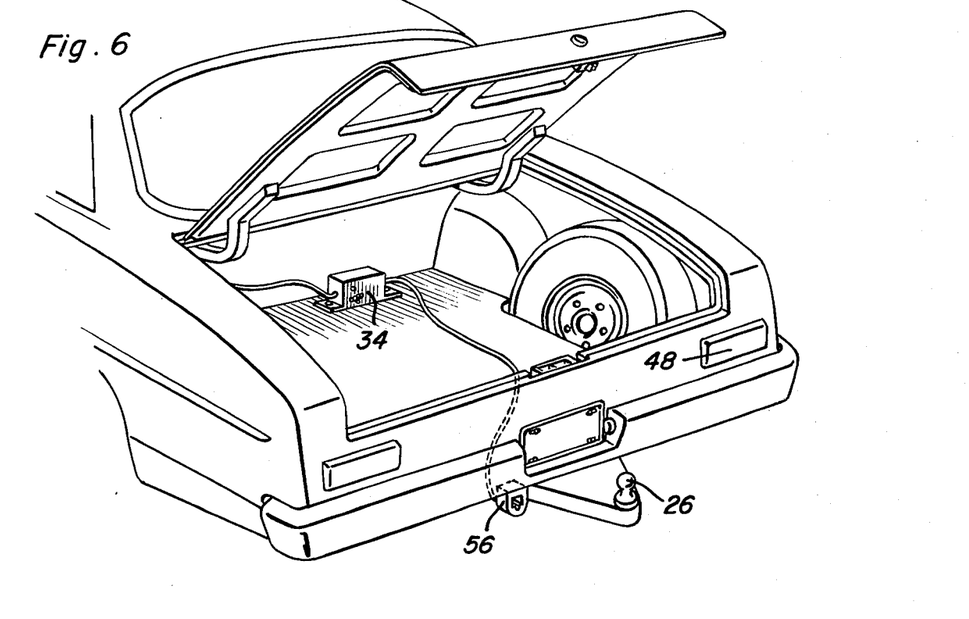
FIG. 6 is a perspective view of a typical towing vehicle trunk with a transducer or sensor associated with the present invention mounted therein.

Referring now to FIGS. 4 and 6 of the drawings, it will be observed that the automatic stability control system of the present invention is provided with a sensor or transducer 34, preferably mounted in the trunk or rear portion of the towing vehicle 22. The sensor is responsive to predetermined lateral acceleration forces acting thereon, as hereinafter explained, and is electrically connected by lines 36 and 37 to an amplifier and control unit 38, preferably mounted to the vehicle dashboard. Unit 38 is appropriately connected to the vehicle storage battery 40 or other source of electrical energy by way of line 42. Towing vehicle brake lights 48 and trailer brake lights 50 are appropriately connected to amplifier unit 38 by way of line 44. The trailer is provided with right and left electrical brakes 52 and 54 which are appropriately connected to the amplifier unit by way of line 46. Preferably, a conventional type connector 56 is provided for convenient disconnection of the lines between the towing vehicle and trailer. Electrical brakes 52 and 54 are of a type which provide braking forces which are proportional to the electric current applied. Amplifier unit 38 controls the magnitude of current fed to the brakes and, as such, controls the magnitude of the braking forces which are applied.

Preferably, sensor 34 is mounted in the towing vehicle trunk or other appropriate location near the rear of the towing vehicle. This mounting arrangement has been found to be most desirable as it substantially eliminates erroneous responses of the system due to bouncing, vibrations, and other movements normally associated with trailers and other towed vehicles but not indicative of adverse handling conditions. The towing vehicle being of greater mass and being at least a two axle vehicle is more stable than the trailer and, as such, is not significantly affected by such movements.

Figure 7:
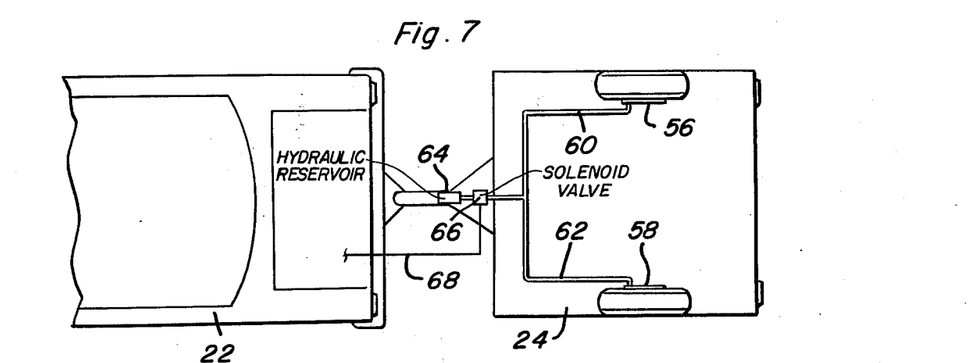
FIG. 7 is a diagrammatic illustration of the system of the present invention utilizing hydraulically operated trailer brakes.

It will be appreciated that the stability control system of the present invention is not limited to the use of electrical brakes such as illustrated in FIG. 4. With reference to FIG. 7, it will be observed that hydraulic brakes 56 and 58 may be utilized with hydraulic lines 60 and 62 being in communication with a conventional hydraulic reservoir 64. A solenoid valve or electrically actuatable piston 66 of a conventional type is operatively connected to the hydraulic system intermediate the reservoir 64 and brake lines 60 and 62. Electrical lines 68 connect amplifier unit 38 to solenoid 66 to effect actuation thereof in response to sensed lateral acceleration forces which exceed a predetermined minimum value. When solenoid 66 is energized it is effective to apply hydraulic pressure to brakes 56 and 58, thereby slowing the trailer down to effect stabilization thereof. Solenoid 66 is such that the hydraulic pressure which it generates is proportional to the current supplied from amplifier unit 38. Thus, the hydraulic braking arrangement provides braking forces the same as the electrical braking arrangement described above and illustrated in FIG. 4.

Figure 8:
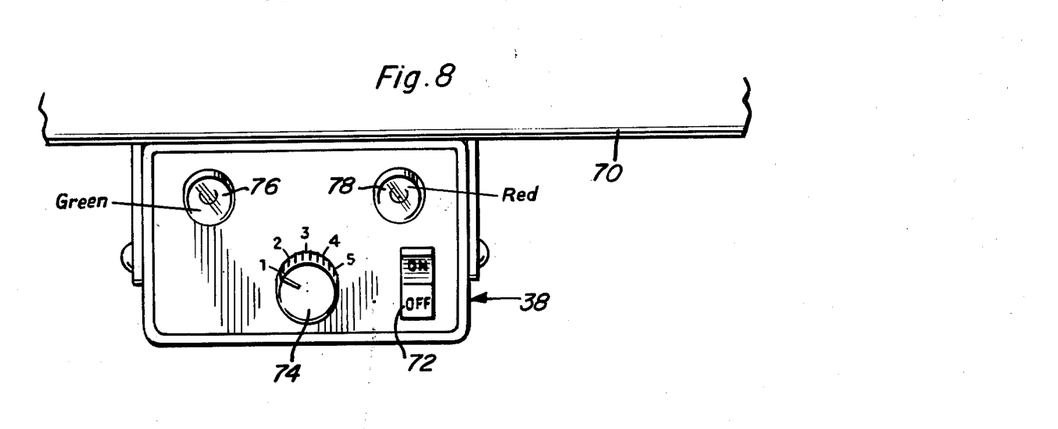
FIG. 8 is an elevational view of a preferred embodiment of the amplifier and control unit associated with the present invention mounted on a vehicle dashboard.

With reference to FIG. 8, a typical embodiment of the amplifier unit is generally indicated by the numeral 38 and is mounted to a typical vehicle dashboard 70 for convenient operation by the driver. The amplifier unit is provided with an on-off switch 72 and a sensitivity adjustment knob 74 for setting the desired threshold for the system, as hereinafter explained. Preferably, the amplifier unit is provided with a pair of indicating lights 76 and 78 mounted on the front of the amplifier unit to indicate to the driver whether the trailer brakes are activated or not. The indicating lights are wired into the amplifier circuit such that lamp 76 is energized when the amplifier unit is on, but without the trailer brakes being applied. Upon application of the trailer brakes, light 78 is energized and light 76 is simultaneously de-energized. This indicates to the vehicle operator that the brakes have been applied such that he may slow down or take other appropriate action if deemed necessary. It should be noted, however, that such action on the part of the driver is seldom necessary as the control system automatically maintains the trailer directly behind the towing vehicle.

Figure 9:
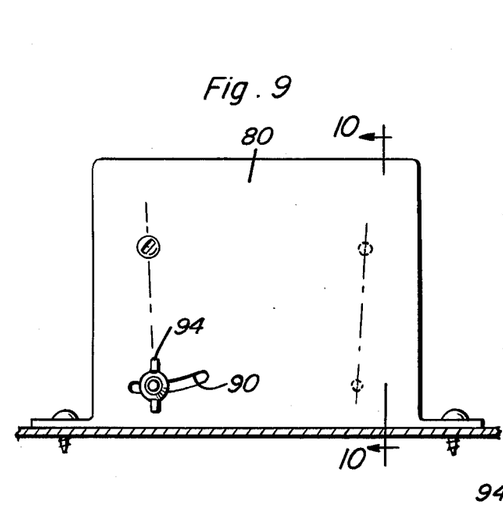
FIG. 9 is an elevational view of one embodiment of the lateral acceleration transducer associated with the present invention.
Figure 10:
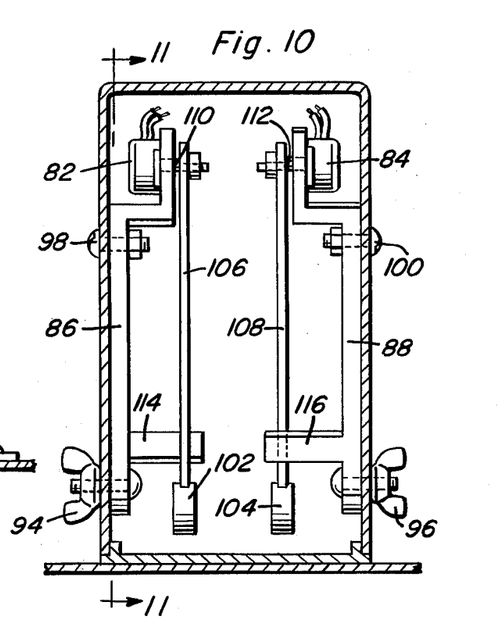
FIG. 10 is a sectional view taken along section 10—10 of FIG. 9.
Figure 11:
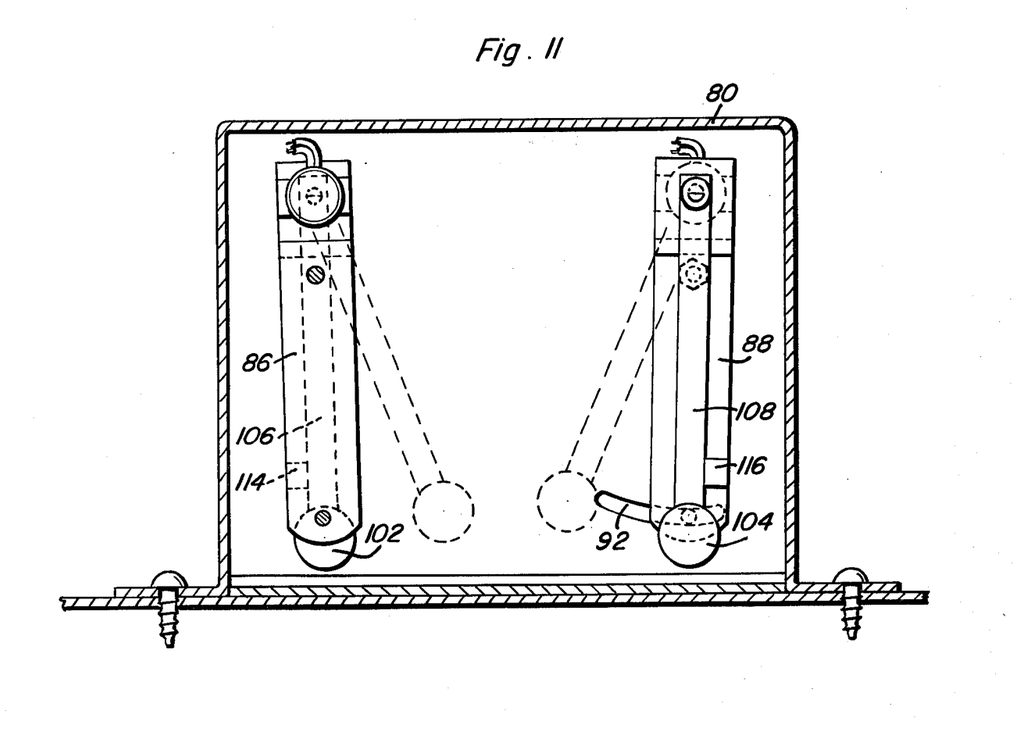
FIG. 11 is a sectional view taken along line 11—11 of FIG. 10.

Referring now, more particularly, to FIGS. 9–11, one embodiment of the lateral acceleration sensor or transducer may be seen in more detail. Preferably, the unit is provided with a housing or enclosure 80 which is adapted to be mounted to the towing vehicle such that the forces imparted to the towing vehicle are also imparted to the transducer. A pair of potentiometers, or rheostats, 82 and 84 are mounted within enclosure 80 by way of adjustable support members 86 and 88, respectively. Housing 80 is provided with a pair of arcuate slots 90 and 92 which cooperate with wing nut type bolts 94 and 96, respectively, for securing support members 86 and 88 in place. Bolts 98 and 100 define pivot points for adjustment of the support members to the desired angle of inclination. Such adjustment is achieved by loosening wing nuts 94 and 96 and moving support members 86 and 88 to the desired angular setting.

It will be appreciated that the sensing unit is provided with a pair of pendulums including mass elements 102 and 104 suspended from pendulum arms 106 and 108, which are affixed at their upper ends to potentiometer shafts 110 and 112 respectively. This arrangement is such that swinging movement of the pendulums provides corresponding movement of the associated potentiometer. This changes the effective resistance value of the potentiometer in the amplifier circuit, as hereinafter explained. Support members 86 and 88 are provided with stop fingers 114 and 116, respectively which are normally engaged by pendulum arms 106 and 108 when the pendulums are at rest. It will be appreciated that adjustment of the support members determines the positions of stop fingers 114 and 116, thereby defining the angle at which the pendulums hang when at rest. Preferably, the stop fingers are positioned such that the pendulums normally hang at a position offset slightly from vertical by an angle of, for example, 3°. This provides stability to the pendulums such that they will not react to very mild lateral acceleration forces, bumps, vibrations or the like. For some applications, it may be desirable to provide a greater angular offset for the pendulums, further increasing their stability such that even larger lateral acceleration forces will be necessary to move the pendulums from their stop fingers. Thus, the angular adjustment setting serves to both stabilize the pendulums against meaningless forces, such as bumps and vibrations, and define a mechanical threshold setting for the overall system.

It will be appreciated that the pendulums are mounted for swinging in opposite directions, such that they respond to lateral acceleration forces acting in opposite directions. The lateral acceleration forces acting in one direction will move one pendulum but will not affect movement of the other. Thus, only one pendulum is displaced from its stop finger at any one time. For each pendulum angle, there is a corresponding potentiometer resistance value which is associated with the amplifier circuit, as hereinafter explained, to ultimately determine the output current from the amplifier unit. The greater the magnitude of the output signals or current from the amplifier, the greater is the braking force of the electrical or hydraulic brakes.

Figure 14:
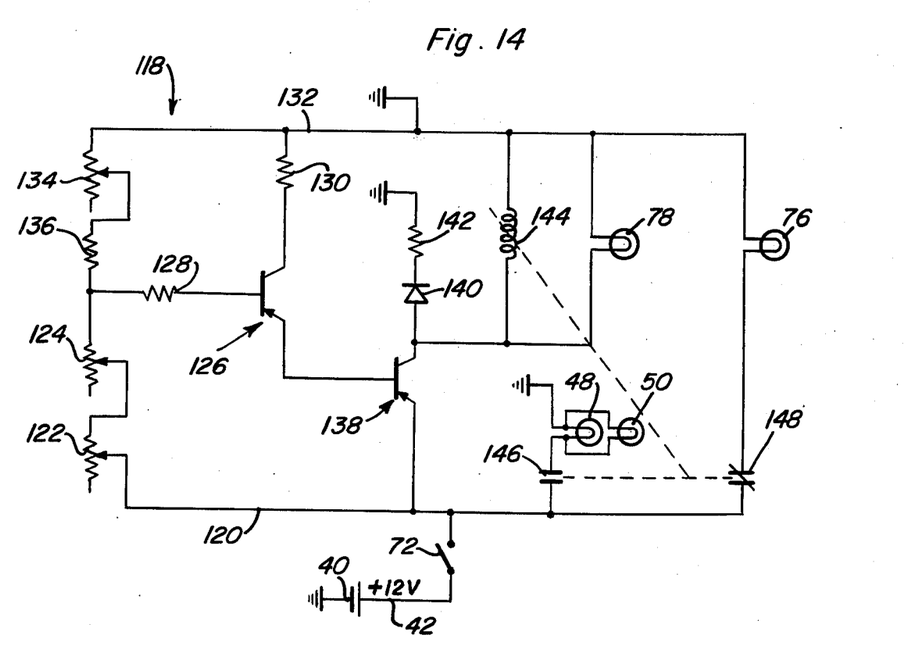
FIG. 14 is a schematic diagram of the circuitry associated with the first form of the system.

With reference to FIG. 14, the schematic diagram of a first form of amplifier circuit associated with the present invention is illustrated. The amplifier is connected to a typical towing vehicle battery 40 by way of line 42 and on-off switch 72. With the on-off switch closed, a +12V, or other appropriate voltage, is supplied to line 120. A pair of adjustable potentiometer resistors 122 and 124, associated with potentiometers 82 and 84, are serially connected to line 120. The amplifier is provided with a first power transistor 126 with a collector resistor 130, connected to ground by line 132. An adjustable sensitivity resistor 134 is connected between ground line 132 and a fixed bias resistor 136. Base resistor 128 is connected to a point between bias resistor 136 and adjustable resistor 124.

A second power transistor 138 is base connected to the emitter of transistor 126. The emitter of transistor 138 is connected to line 120 and its collector is connected to electrical brake circuit 142 through diode 140. It will be appreciated that when transistor 138 is conductive, current flows to electric brake circuit 142 to apply the trailer brakes in a manner explained above. Normally both transistors 126 and 138 are nonconductive. When predetermined lateral acceleration forces are sensed by either pendulum of the transducer, the value of resistor 122 or resistor 124 in the amplifier circuit is increased. When either of these resistances is increased to a predetermined value, the base of transistor 126 is driven sufficiently negative to drive it into conduction. This, in turn, renders transistor 138 conductive and the trailer brakes are applied. The greater the composite value of resistance introduced into the input circuit by resistors 122 and 124, the greater will be the current flow through the power transistors and the larger will be the braking forces.

It will be appreciated that the potential of the base of transistor 126 is determined in part by the combined resistance of serially connected resistors 134 and 136. By adjusting the value of resistor 134, the point at which transistor 126 conducts may be selected. In effect, this provides an electrical threshold setting which determines how far the pendulums must be displaced in order to render the transistors conductive to apply the trailer brakes. The sensitivity may be set at the most desirable position corresponding to the particular trailer load, road conditions, and the like. It is important to note that this setting may be conveniently made by the vehicle operator while the vehicle is in motion. This permits the driver to test the system to provide the most desirable setting. Furthermore, if road conditions should change, the driver can make the appropriate adjustments without stopping the vehicle. It will also be appreciated that the current conducted by transistor 138 is directly proportional to the change in resistance of the pendulum sensors above the electrical threshold point. This is an important feature as it provides braking forces which are proportional to the lateral acceleration forces above the threshold setting. Thus, mild lateral acceleration forces will provide light braking forces and larger lateral acceleration forces will provide relatively heavier braking forces. Such an arrangement provides a high degree of stability to the trailer regardless of the lateral acceleration forces. It is also emphasized that such control is provided automatically without the attention of the driver once the sensitivity setting has been made.

Referring again to FIG. 14, it will be observed that the amplifier control unit is provided with a relay coil 144 connected between the collector of power transistor 138 and ground line 132. Indicating light 78 is also connected in parallel with coil 144. When transistor 138 conducts under adverse lateral acceleration conditions, relay coil 144 and indicating light 78 are energized. Energization of indicating light 78 informs the driver of the adverse conditions and that the trailer brakes have been automatically applied. Relay coil 144 is operatively connected to normally opened contact 146 and normally closed contact 148. Indicating lamp 76 associated with the amplifier unit is serially connected to normally closed contact 148. Brake lights 48 and 50 associated with a towing vehicle and trailer are connected to normally opened contact 146. When relay coil 144 is energized, the brake lights are energized, while indicating light 76 is de-energized. Thus, the amplifier control unit associated with the present invention not only provides automatic control operation of the trailer brakes, but also indicates such a condition to the vehicle operator and effects energization of the vehicle and trailer brake lights.

Figure 12:
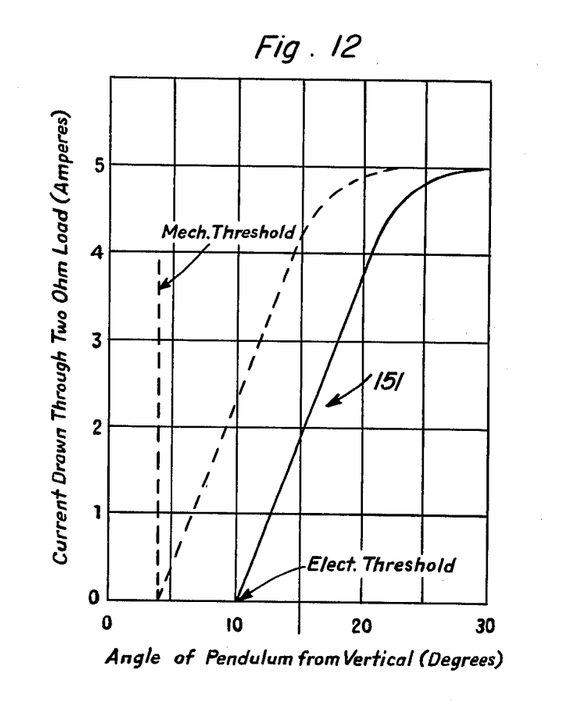
FIG. 12 is a graphic representation of a typical curve of current versus pendulum angle of the transducer.

Referring to FIG. 12, a typical response curve of the amplifier with the pendulum type sensor is generally indicated by the numeral 151. As mentioned above, the mechanical threshold setting is defined by the positions of the stop fingers. This setting is indicated by the vertical dash line 153 and is at approximately 3°. The electrical sensitive setting is such that the amplifier responds when either pendulum swings to 10°. The sensitivity may be set at a maximum such that the amplifier responds at 3°, rather than 10°. It will be appreciated that the sensitivity adjustment in effect shifts the curve to the right or left. As the pendulum is displaced from the mechanical threshold setting, current flow through the potentiometer is increased, thereby changing the base bias of the input transistor, as explained above. Of course, this curve is merely representative of a typical amplifier and potentiometer type sensor arrangement and is provided to illustrate the relationship between the pendulum position and current flow and the continuity therebetween, to provide continuous controlled braking.

Figure 13:
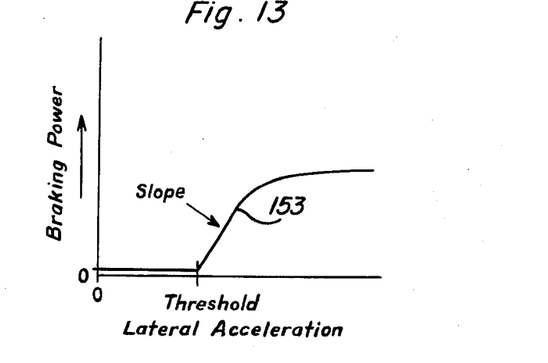
FIG. 13 is a graphic representation of a typical curve of braking power versus lateral acceleration.

FIG. 13 illustrates the relationship between the lateral acceleration forces and the braking power which is automatically applied. With reference to curve 153, it will be observed that no power is applied to the brakes until the electrical threshold setting has been reached. When the lateral acceleration forces increase beyond the threshold point, there is a corresponding increase in braking power. Preferably, there is linearity between the braking power and the magnitude of the lateral acceleration forces along a considerable portion of the curve. This provides the desired stability control for the trailer. Of course, it will be appreciated that the amplifier circuitry and braking mechanism may be appropriately modified to provide various relationships between the lateral acceleration forces and the braking power and it is not intended that the present invention be limited to the curve illustrated in FIG. 13. It is important to note, however, that the functional relationship is smooth and continuous with no holes or steps in the curve.

Figure 5:
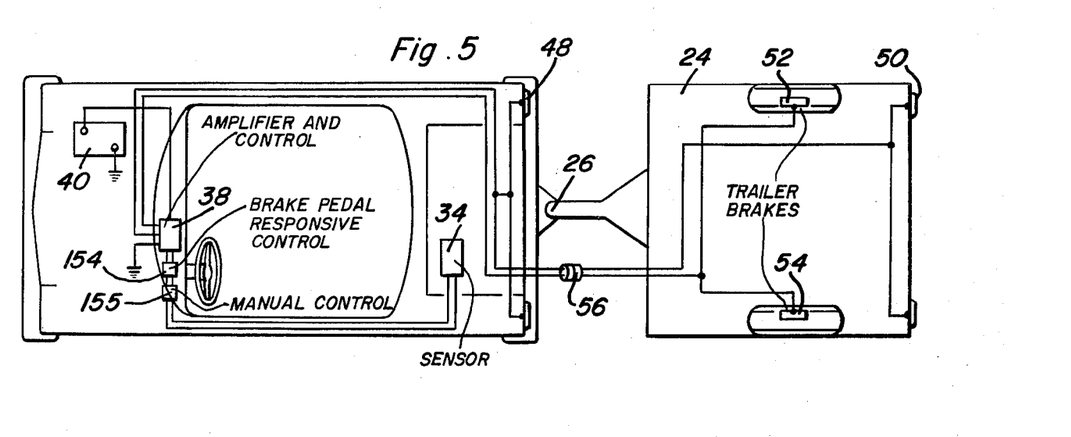
FIG. 5 is a diagrammatic illustration of a second form of the automatic stability control system of the present invention.
Figure 15:
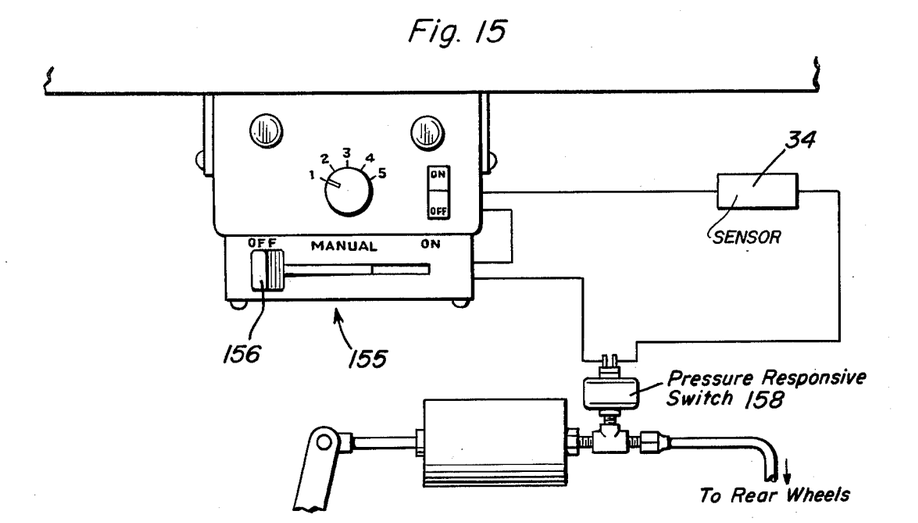
FIG. 15 is a simplified diagram of a second form of the system of the present invention.

Referring to FIGS. 5 and 15, a second form of the stability control system is illustrated and is similar to the first form, but is provided with a brake pedal responsive control 154 and a manually adjustable control 155. By providing the system with these controls, additional versatility is provided which permits control over the trailer braking system under a variety of conditions. These controls are serially connected to the amplifier control unit and to the potentiometers of the lateral acceleration sensor 34. Preferably, the manual control 155 is mounted to or adjacent to the amplifier unit for convenient operation by the vehicle driver. The manual unit is a commercially available item which includes an adjustable lever 156 which is operatively connected to a rheostat, not illustrated, such that as the control is moved from left to right the effective value of resistance in the amplifier circuit is correspondingly changed. The brake pedal responsive unit 154 may be of either the mechanical or hydraulic type which are also commercially available items. The hydraulic type, illustrated in FIG. 15, is indicated by the numeral 158 and is connected to the hydraulic brake system of the towing vehicle. Control unit 154 also includes an adjustable resistor which provides resistance to the system amplifier which is proportional to the hydraulic pressure. Control units 155 and 158 are serially connected to each other and to the potentiometers of sensor unit 34.

Figure 16:
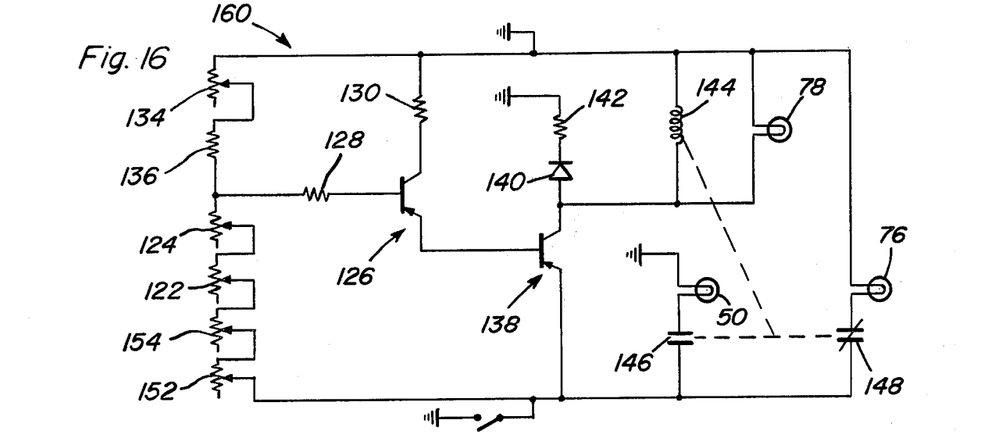
FIG. 16 is a schematic diagram of the circuitry associated with the second form of the system of the present invention.
Figure 17:
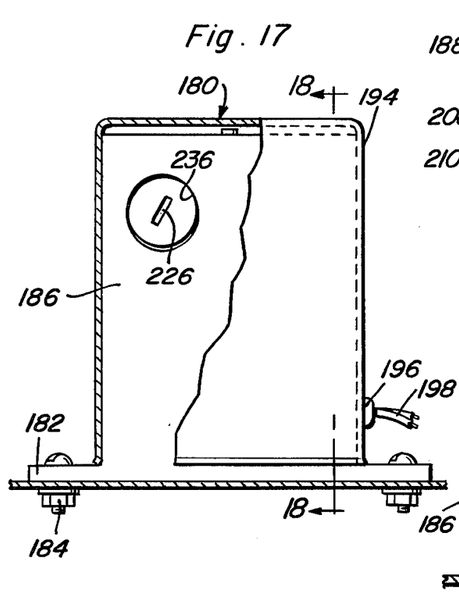
FIG. 17 is a side elevational view of another embodiment of the lateral acceleration transducer employed in the present invention.

With reference to FIG. 16, the schematic diagram of the circuitry associated with the second form of the stability control system is generally indicated by the numeral 160 and is identical to the circuit of the first form illustrated in FIG. 14, except that it is provided with additional resistances 152 and 154 of the manual and brake pedal responsive units described above. These resistances are serially connected to variable resistors 122 and 124. It will be appreciated that the base bias of transistor 126 is determined by the combined value of resistances 122, 124, 152, and 154. With the manual unit 154 in the off position, the resistance introduced into the amplifier input is negligible. This is also true of the resistance introduced by the brake pedal responsive unit when the towing vehicle brakes are not applied. Under these conditions, the system responds identically to the system illustrated in FIG. 14. In the event that the vehicle operator wishes to apply the trailer brakes independently of the lateral acceleration sensor, he may do so by adjusting the resistance 154. The increase is this resistance provides a corresponding increase in braking force above the threshold setting or conductive point of transistor 126. It will also be appreciated that if the vehicle operator applies the towing vehicle's brakes, resistance 152 will increase to cause corresponding actuation of the trailer brakes. Such an arrangement significantly enhances the control system in that it provides manual and semi-automatic control over the trailer brakes. It is also emphasized that the manual control provides redundancy within the overall system, such that the driver may apply the trailer brakes in the event that the lateral acceleration sensor fails to respond properly.

Figure 18:
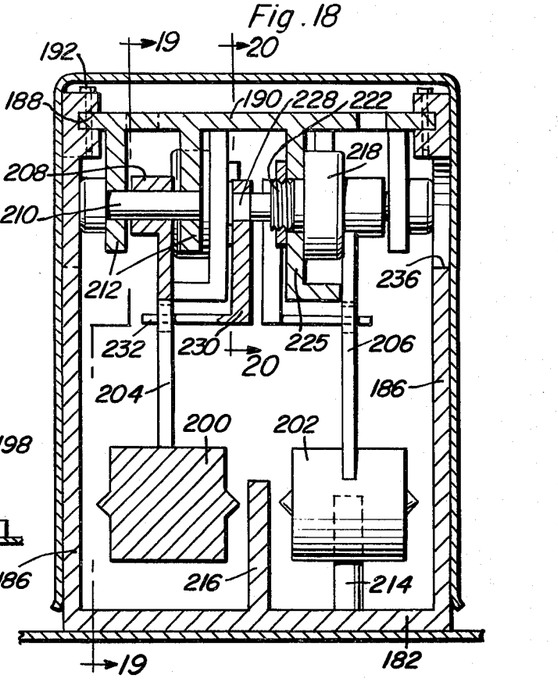
FIG. 18 is a vertical sectional view, on an enlarged scale, taken substantially upon a plane passing along section line 18—18 of FIG. 17 illustrating the structural details of this embodiment of the invention.

FIGS. 17–20 illustrate another embodiment of the lateral acceleration sensor or transducer which has some advantages of construction as compared with that embodiment illustrated in FIGS. 9–11. This embodiment of the transducer is designated generally by reference numeral 180 and includes a base plate 182 secured to a supporting panel such as the trunk of a vehicle by fasteners 184. The base plate 182 includes rigid upstanding side plates 186 rigid therewith and parallel to each other with the upper ends of the plates 186 including inwardly facing grooves or channels 188 which slidably receive a top plate or supporting plate 190 therebetween as illustrated in FIG. 18. Removable pins or other suitable fasteners 192 are inserted through the structure which defines the channels 188 and the edges of the top plate 190 for removably securing the top plate in position. A concealing cover 194 telescopes over the plates 186 and may be provided with a panel with identifying indicia or other desired indicia thereon with the cover being held in place by friction, snap fit or by any other suitable means. The cover is provided with a grommet 196 receiving electrical conductors 198 which are associated with the components of the transducer in a manner described hereinafter.

A pair of pendulums including weights or mass elements 200 and 202 are disposed between the plates 186 with the mass elements being supported by arms 204 and 206 respectively. Each of the arms 204 and 206 is provided with a sleeve 208 on the upper end thereof with the sleeve being journaled on a shaft 210 extending through a pair of depending plates or brackets 212 fixed to and depending from the undersurface of the plate 190. The shaft 210 is inserted from the outer side edge of the plate 190 and is retained in position when the plate 190 is slid into the channels 188 as illustrated in FIG. 18. Thus, with this construction, the pendulums are supported solely from the shafts 210 and are freely swingable thereon with the sleeve 208 precluding any substantial lateral movement of the pendulums. The base plate 182 is also provided with upstanding stop members or pins 214, one for each weight or mass element which function in the same manner as the stop fingers 114 and 116 in FIG. 10, that is, limiting swinging movement of the pendulums to a single direction and orienting the mass elements slightly off of vertical center so that the pendulums will not react to very mild lateral acceleration forces, bumps, vibrations or the like. The base plate 182 is also provided with an upstanding partition 216 which separates the pendulums and extends above the centers of the mass elements 200 and 202 which are provided with conical projections at the center to reduce any possibility of frictional drag occurring in the event of contact between the mass elements and the associated plates 186 or partition 216.

Figures 19, 20:
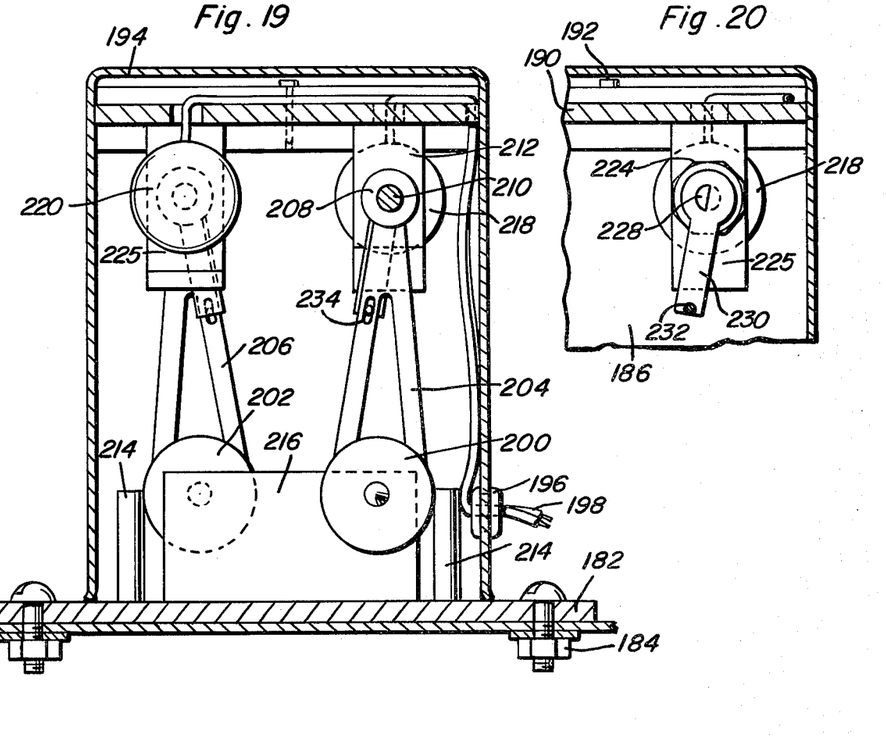
FIG. 19 is a vertical sectional view taken substantially upon a plane passing along section line 19—19 of FIG. 18 illustrating further structural details of the invention.
FIG. 20 is a detail sectional view taken substantially upon a plane passing along section line 20—20 of FIG. 18 illustrating further structural details of the pendulum and potentiometer supporting structure.

Supported independently of the shafts 210 is a pair of potentiometers 218 and 220 each of which has a threaded extension 222 extending through an apertured depending bracket 224 which is rigid with and depends from the top plate 190. The threaded end of the extension 222 is provided with a lock nut 224 which secures the potentiometer in adjusted position rotationally about the central axis. By loosening the nut 224, the potentiometer may be rotated either by grasping with the fingers or by engaging a screw driver or the like in a kerf or notch 226 provided in the potentiometer housing. Also, each potentiometer includes a shaft 228 having a flattened terminal end on which is mounted a depending arm 230 having a projecting pin 232 on the lower end thereof which is received in a longitudinally elongated slot 234 in a pendulum arm.

As illustrated in FIG. 18, the potentiometer 218 has its arm 230 and pin 232 associated therewith engaged with the slot 234 in the pendulum arm 204 inasmuch as the pendulum and potentiometer assemblies are arranged in staggered relationship as illustrated in FIGS. 18 and 19. The lower end of each supporting bracket 225 extends in underlying relation to its supported potentiometer and terminates to stabilize a pendulum arm as illustrated in FIG. 18. An access opening 236 may be provided in each plate 186 to enable access to the potentiometers to facilitate adjustment thereof. Also, as illustrated, the long end portion of the sleeve 208 is oriented on the shaft in remote relation to the potentiometer and after the potentiometer has been adjusted, the cover is snapped into position. In this arrangement, the entire weight of the pendulum is supported on a shaft independent of the potentiometer shaft thereby increasing the longevity of the device and simplifying the adjustment thereof so that once the device has been properly installed, it should not need any further attention or adjustment with the operator of the vehicle varying the sensitivity control from the dashboard.

From the foregoing description, it will be appreciated that all forms of the automatic stability control system provide a versatile means of preventing swaying or swerving of a trailer behind a towing vehicle due to lateral acceleration forces. It will also be appreciated that the sensitivity adjustment of both systems provides a convenient and highly versatile means by which the towing vehicle driver can adjust the system's response, or threshold setting. It should be noted that the stability control system automatically provides trailer braking forces which are gradually and continuously applied and are proportional to the lateral acceleration forces. Of course, it is not intended that the system of the present invention be limited to the circuitry illustrated in FIGS. 14 and 16, as various amplifier circuits may be utilized. It should also be noted that the system of the present invention is not limited to the use of the pendulum type sensor illustrated in FIGS. 9–11. Other types of appropriate sensors, such as strain gauges, may be utilized with the amplifier circuit to provide appropriate input signals thereto. While the system has been specifically disclosed in association with a towing and a towed vehicle combination, it is also effective when mounted in a single vehicle to gradually and continuously apply the rear or all wheel brakes with a force proportional to the lateral acceleration forces. The strain gauge sensors mentioned in the first part of this paragraph may take the form of commercially available strain gauge acceleration sensors in replacement of the pendulums and their associated potentiometers in the lateral acceleration sensing circuitry. In addition commercially available strain gauge hydraulic pressure transducers could take the place of the pressure responsive switch in the brake pedal sensing circuitry. Also, while the circuitry illustrated in FIG. 16 discloses a method for incorporating the brake pedal sensor and the manual braking sensor into the overall braking circuitry in which these sensors are in series with the pendulum sensors or potentiometers sensing lateral acceleration, this invention also contemplates a method of incorporating the brake pedal sensor and the manual braking sensor into the braking circuitry in parallel relation with the pendulum sensors as specifically illustrated in FIG. 21. This arrangement enables separate and independent sensitivity adjustment or control for the lateral acceleration and brake pedal sensors whereas in the series arrangement illustrated in FIG. 16, when the sensitivity is adjusted for the lateral acceleration, the sensitivity to the brake pedal application is also altered.

Figure 21:
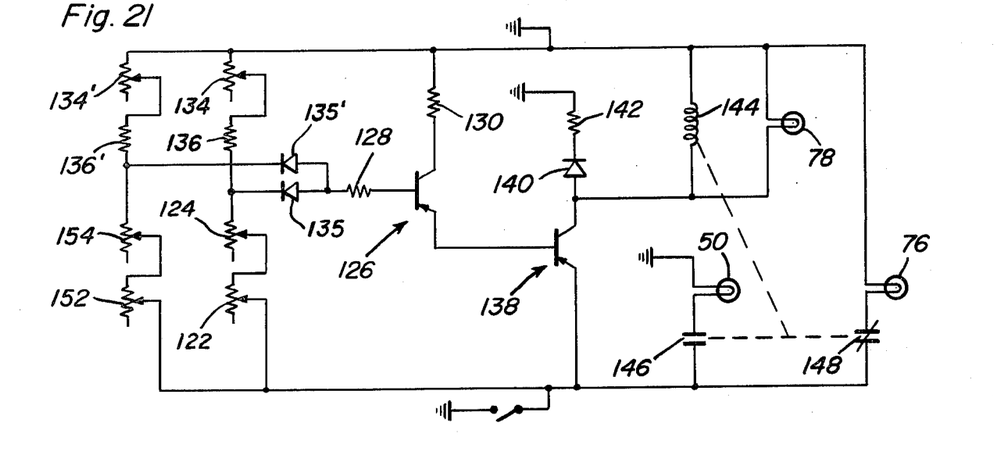
FIG. 21 is a schematic diagram similar to FIG. 16 illustrating a modified arrangement in which the brake pedal sensor and manual sensor are in parallel with the pendulum sensors to provide separate sensitivity controls for the lateral acceleration and brake pedal sensors.

In FIG. 21, the brake pedal sensor 152 and the manual braking sensor 154 operate in parallel with the two lateral acceleration sensors 122 and 124 and a new bias resistor 136' and sensitivity potentiometer 134' are added in addition to the two diodes 135 and 135'. In effect, a new input bias circuit to the transistor 126 is added in parallel to the one illustrated in FIG. 16 and these two input circuits are diode isolated from each other allowing independent operation of the automatic system and the driver-initiated system. Thus, sensitivity potentiometer 134' controls the sensitivity of the braking system to inputs from the brake pedal sensor 152 and the manual braking sensor 154. The sensitivity potentiometer or adjustable resistor 134 on the other hand controls the sensitivity of the system to inputs from the lateral acceleration sensors 122 and 124. Due to the configuration of the diodes 135 and 135', the braking system responds to the maximum braking force called for by either the automatic sensors or the driver responsive sensors. For example, if the lateral acceleration sensors 122 and 124 at some instant in their operation are calling for two amps of current to be drawn through the electric brakes and the driver (either by operation of the manual lever or the vehicle brake pedal) is calling for four amps of current to the brakes, then the system will respond by sending four amps (the greater) to the brakes. Thus, operation of the automatic and driver initiated sensors is completely independent.

This arrangement has advantages over that illustrated in FIG. 16 by enabling incorporation of the brake pedal sensor and manual braking sensor in parallel to the pendulum sensors or lateral acceleration sensors with separate adjustable resistors and bias resistors with the two input bias circuits to the transistor being diode isolated from each other thereby allowing independent operation and adjustment of the automatic system and the driverinitiated system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An automatic stability control system for a vehicle to prevent swerving and swaying of said vehicle, said system comprising: means for sensing lateral acceleration forces acting upon said vehicle to provide low level electrical acceleration signals proportional to the magnitude of said forces, means for amplifying said low level acceleration signals to provide large amplitude brake control signals proportional to the magnitude of the forces, and brake means associated with said vehicle including right and left brakes and responsive to said brake control signals to simultaneously actuate said right and left brakes in an equal gradual and continuous mode to prevent swaying and swerving of said vehicle, said sensing means including a suspended mass oriented to sense lateral acceleration and provide instantaneous response upon sensing lateral acceleration.

2. The system set forth in claim 1 wherein said amplifier means includes sensitivity adjustment means for setting the minimum magnitude of lateral acceleration force to which said amplifier means responds to provide said brake control signals.

3. The system set forth in claim 2 wherein said sensitivity adjustment means defines an electrical threshold setting for said amplifier means.

4. The system set forth in claim 3 wherein said sensitivity adjustment means includes adjustable bias resistance means associated with said amplifier means.

5. The system set forth in claim 3 wherein said sensitivity adjustment means is located in said vehicle for convenient operation by the driver.

6. The system set forth in claim 1 wherein said lateral acceleration sensor means includes first and second independent transducer means respectively responsive to lateral acceleration forces acting in opposite directions.

7. The system set forth in claim 6 wherein said first and second transducer means include first and second adjustable resistance means respectively associated with said amplifier means.

8. The system set forth in claim 7 wherein said first and second adjustable resistance means are connected to the bias circuit of said amplifier means.

9. The system set forth in claim 8 wherein said first and second adjustable resistance means are serially connected to each other.

10. The system set forth in claim 9 together with auxiliary adjustable resistance means connected in series with said first and second adjustable resistance means to effect actuation of said brake means under predetermined conditions independent of said lateral acceleration forces.

11. The system set forth in claim 6 wherein said first and second transducer means are mounted to a towing vehicle of an articulately connected towing and towed vehicle assembly.

12. The system set forth in claim 1 together with auxiliary control means connected to said amplifier means for operating said electric brake means under predetermined conditions independent of said lateral acceleration forces.

13. The system set forth in claim 12 wherein said sensing means includes adjustable resistance means associated with said amplifier means.

14. The system set forth in claim 13 wherein said auxiliary control means includes auxiliary adjustable resistance means connected to said first-mentioned variable resistance means.

15. The system set forth in claim 14 wherein said auxiliary control means includes brake means responsive to operation of the towing vehicle brake system.

16. The system set forth in claim 15 wherein said auxiliary control means further includes manually adjustable resistance means.

17. The system set forth in claim 14 wherein said auxiliary control means includes brake responsive resistance means responsive to operation of the towing vehicle brake system and manually adjustable resistance means.

18. The system set forth in claim 17 wherein said towing vehicle brake responsive resistance means and said manually adjustable resistance means are serially connected.

19. The system set forth in claim 18 wherein said serially connected brake responsive resistance means and manually adjustable resistance means are connected in parallel with the lateral acceleration sensing means for independent adjustment of the sensitivity of the brake responsive and manually adjustable resistance means with respect to the lateral acceleration sensing means.

20. The automatic stability control system as defined in claim 1 wherein said suspended mass includes a pair of pendulums oriented to sense only left and right acceleration, respectively, each of said pendulums including means for varying the minimum lateral acceleration force necessary to effect movement thereof, each of said pendulums being operatively associated with a variable resistance to provide low level electrical lateral acceleration signals proportional to the magnitude of movement of the pendulums.

21. The automatic stability control system defined in claim 20 wherein each of said pendulums includes an upstanding arm, a horizontal shaft means pivotally supporting each of said arms, each of said arms being operatively associated with a control element of a potentiometer forming the variable resistance whereby pivotal movement of the pendulum arm will vary the adjustment of the potentiometer without introducing the weight of the pendulums onto the potentiometers.

* * * * *